July 12, 1938. E. WEGMANN 2,123,818
LABYRINTH PACKING
Filed July 7, 1936

Inventor
ERNST WEGMANN
By B. Singer
Attorney

Patented July 12, 1938

2,123,818

UNITED STATES PATENT OFFICE 2,123,818

LABYRINTH PACKING

Ernst Wegmann, Kloten, Zurich, Switzerland

Application July 7, 1936, Serial No. 89,465
In Germany and Switzerland July 11, 1935

3 Claims. (Cl. 286—10)

The invention relates to an improvement in labyrinth packings, especially to a device for reducing the steam loss in such labyrinth packings. The labyrinth packings hitherto known endeavored to reduce the loss of steam to a minimum by making the radial clearance in the narrowest part of the steam passage a minimum. This method however has the drawback that the labyrinths soon come into touch with the fixed parts of the packing as soon as the turbine shaft begins to oscillate. More or less strong oscillations can hardly be obviated especially when the critical number of revolutions is reached, when the load is suddenly altered, and when oscillations of the driven machine are transmitted to the shaft, etc.

The object of this invention is to provide for a labyrinth packing in which the steam loss is small altho the radial clearance between packing rings and surrounding bush is comparatively great.

I attain this object by creating a cross stream of the steam, e. g. a deviation in the axial steam flow by disposing grooves immediately before the narrow passages in such a packing.

In order to make the invention more clearly understood there are shown in the accompanying drawing some modifications of my invention without limiting the improvements, in their useful applications, to the particular constructions which, for the purpose of explanation, have been made the subject of illustration.

Figure 1:
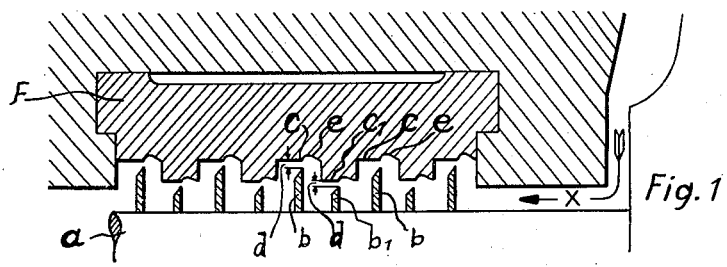
Fig. 1 is an axial section of a labyrinth packing with a fixed bush.

Referring to the drawing, $a$ is the turbine shaft on which, according to Figure 1 rings $b$, $b_1$ have been fixedly secured. Said rings $b$, $b_1$ form together with the inner surfaces $c$, $c_1$ of the collar bush $f$ the narrow passages $d$ for the steam. The direction of the steam flow is indicated by arrow $x$. The surfaces $c$, $c_1$ are provided with grooves $e$.

Figure 2:
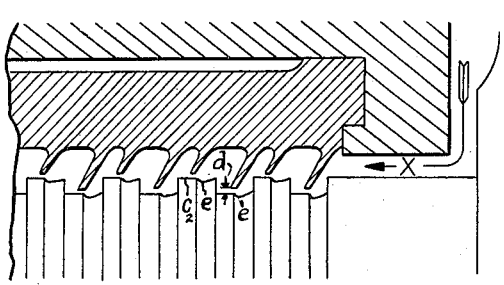
Figs. 2 and 3 show modifications with revolving collars.
Figure 6:
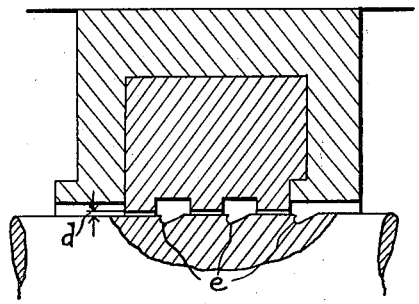
Fig. 6 shows a modification in which carbon rings or similar material has been used as packing material.
Figure 3:
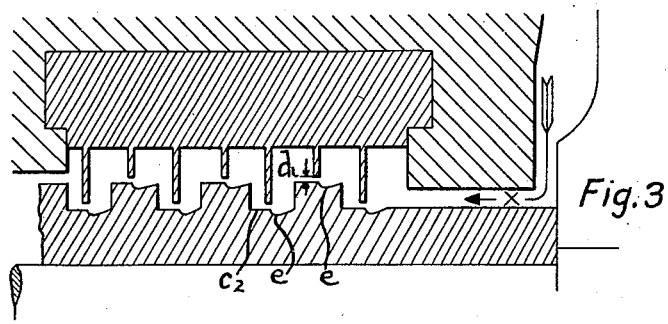

In the modification according to the Figs. 2 and 3 the grooves $e$ are arranged on the outside of the revolving collars $c_2$. Instead of the intermediate collar-bushes on the shaft as shown in Figs. 2 and 3, the grooves $e$ can be machined directly in the plain surfaces of the shaft and soft material can be used for the bushes $f$.

Figure 4:
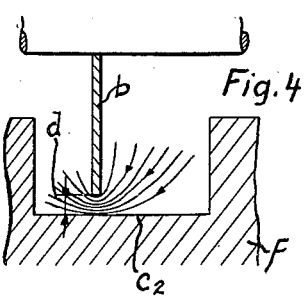
Figs. 4 and 5 show the flow of the steam in labyrinth packings on a larger scale.
Figure 5:
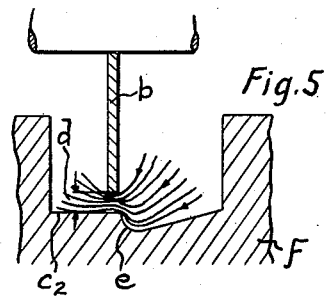

Fig. 4 shows the steamflow in the known labyrinth packings. Only a very small contraction of the steamflow can be observed. By providing grooves $e$ just before the narrow passages $d$ however, a radial cross stream of the steam is created which makes the contraction greater and the amount of steam flowing through passage $d$ considerably smaller.

What I claim is:

1. In a labyrinth packing, a rotor member turning within a stator member, one of said members having elongated grooves and counter-grooves, the other member having rings projecting into the elongated grooves of the first member, each of said counter-grooves having a curved end placed just in front of the opposite inlet edge of the adjacent ring, in virtue of all of which there is created a cross stream before the narrowest passage, so as to increase the contraction of the steam flow and to reduce the quantity of the steam flowing through said narrowest passage.

2. In a labyrinth packing, a rotor member turning within a stator member, one of said members having major grooves and the other having rings projecting into said major grooves toward the bottoms thereof but spaced from said bottoms to leave narrow steam passages, the grooved member having a counter-groove in the bottom of each major groove adjacent but to one side of the said ring in the major groove, said counter-grooves each having a curved end placed just in front of the opposite inlet edge of the adjacent ring.

3. In a labyrinth packing, a rotor member turning within a stator member, one of said members having major grooves and the other having rings projecting into said major grooves toward the bottoms thereof but spaced from said bottoms to leave narrow steam passages, the grooved member having a counter-groove in the bottom of each major groove adjacent but to one side of the said ring in the major groove, said counter-grooves each comprising a concave area adjacent the ring and an inclined area remote from the ring and merging with the concave area.

ERNST WEGMANN.